July 16, 1940.  J. W. BEECHER  2,207,908
METERING AND INTEGRATING APPARATUS
Filed Oct. 1, 1938  2 Sheets-Sheet 1
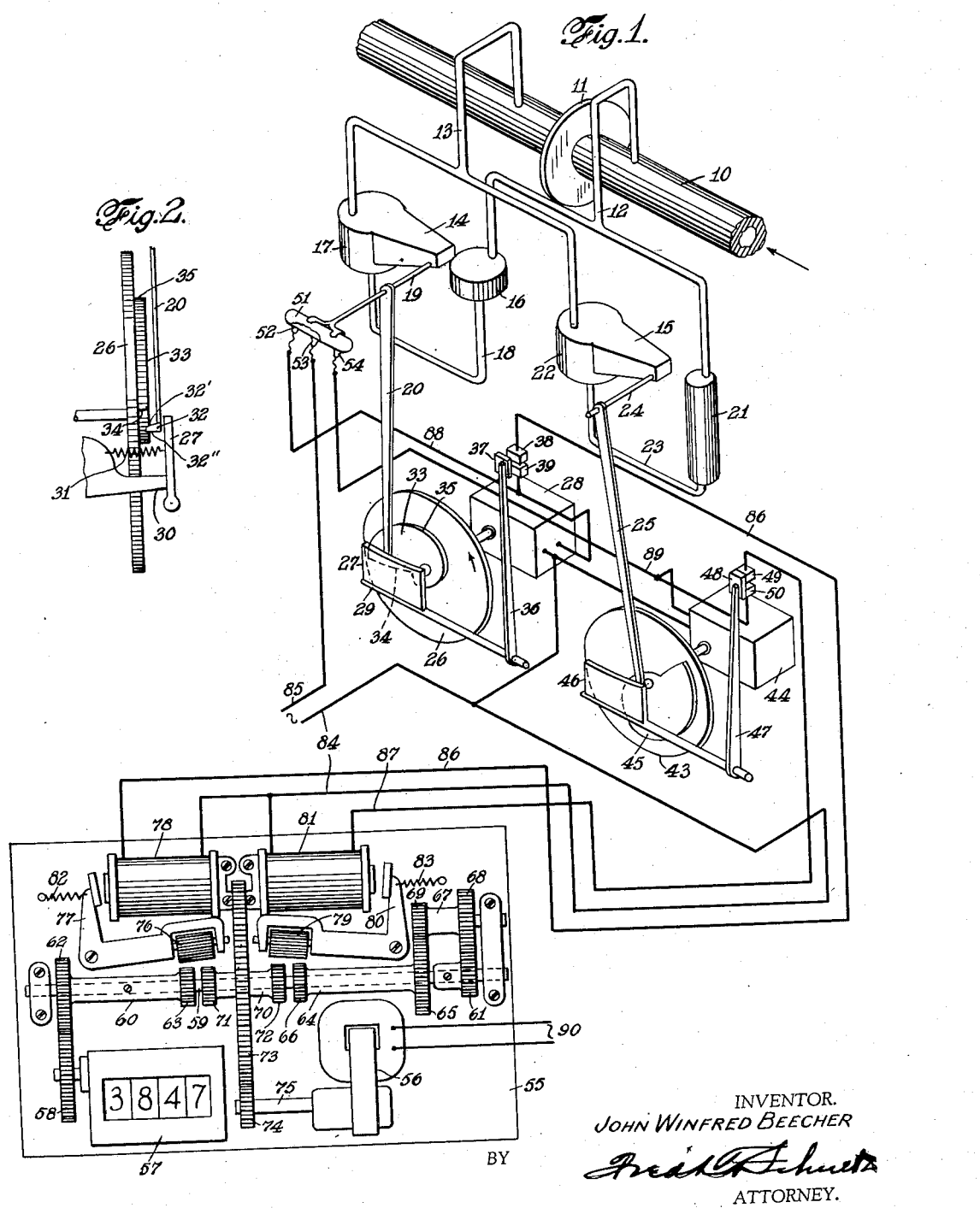
INVENTOR.
JOHN WINFRED BEECHER
BY
ATTORNEY.

July 16, 1940.  J. W. BEECHER  2,207,908
METERING AND INTEGRATING APPARATUS
Filed Oct. 1, 1938  2 Sheets-Sheet 2
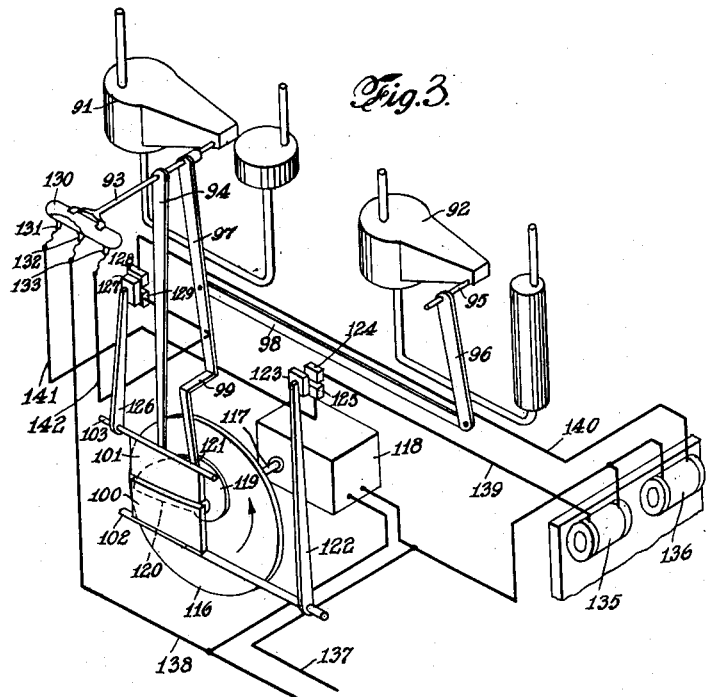
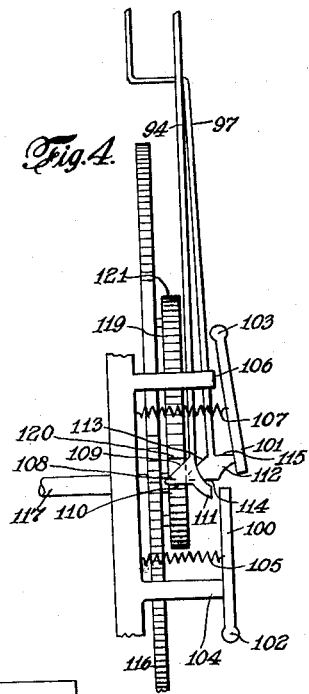
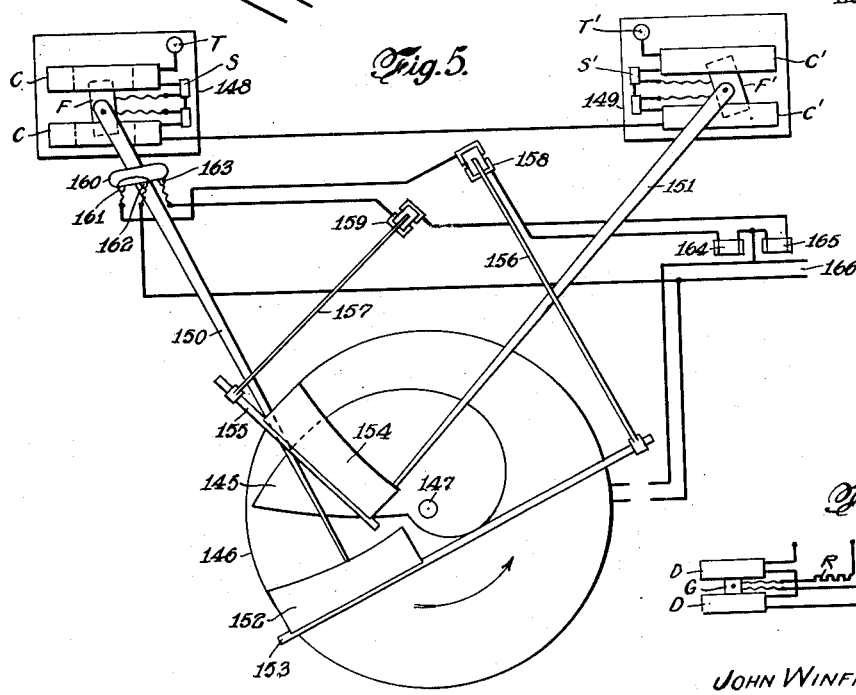
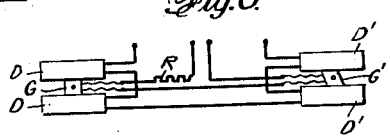
INVENTOR.
JOHN WINFRED BEECHER
BY
ATTORNEY.

Patented July 16, 1940

2,207,908

UNITED STATES PATENT OFFICE 2,207,908

METERING AND INTEGRATING APPARATUS

John Winfred Beecher, Waterbury, Conn., assignor to The Bristol Company, Waterbury, Conn., a corporation of Connecticut Application October 1, 1938, Serial No. 232,700

10 Claims. (Cl. 73—197)

This invention relates to integrating meters, and more especially to meters of the electrically actuated type for integrating flow of fluids or other variables with respect to time, where there is required a high degree of accuracy in measurement and integration, over extreme ranges of the scale of measurement.

In the measurement of fluid flow by means of an orifice or a Venturi tube or the like, in which the pressure differential developed by the flow of the fluid to be measured through such a device is applied to a manometer or other pressure-responsive element, it is a well known principle that the flow varies as the square root of the differential, or, in other words, that the measured pressure varies as the square of the flow. The result of this principle is made manifest in a quadratic proportionality to the scale of the pressure measuring instrument when calibrated in terms of flow.

Similarly, in the measurement of electric current values by means of a movement responsive to alternating-current values, the torque and consequent deflection obtained is inherently proportional to the square of the magnitude under determination, giving the conventional "squared scale" characteristics of alternating-current ammeters, which, though subject to a certain degree of correction by geometrical configuration of parts, cannot thus be brought to a degree of uniformity sufficient to enable direct integration to be performed with a view to obtaining a measure of alternating-current ampere-hours.

In the adaptation of meters of this class to integration, it is essential that there be provided a compensation for the inherent quadratic characteristic of the scale; and this result may be attained by a number of well-known expedients, depending upon the principle by which the integration is obtained. For example, as set forth in U. S. Letters Patent No. 2,088,568, issued August 3, 1937, integration is accomplished by the periodic advance of a counting train as influenced by electrical contacts controlled by a constantly rotating cam or scroll-plate associated with a pointer whose deflection is proportional to the pressure differential across an orifice in a pipe line in which flow is to be measured. In this form of flow meter, the compensation for the non-linear proportionality existing between the deflection and the flow is effected by conforming the trailing edge of the cam to a square-root law, whereby the durations of successive impulses are made proportional to the then rates of flow through the pipe line or conduit.

While the method above set forth makes possible the compensation for non-linear characteristics inherent to certain classes of measuring systems, there yet remains the fact that by virtue of the relatively crowded nature of the lower part of the scale of the current measuring element, when calibrated in units of flow, there will be a proportional loss in precision of measurement at times when the velocity of flow or current is low as compared with the maximum which the meter is adapted to measure. In installations where the flow is likely to vary over a wide range, and to continue for extended time periods at a relatively low value, the integrated flow flowing during these periods may be as great as, and even greater than, the quantity passing during relatively short times of accelerated flow. For this reason, and in order for the total integration of the meter to be consistently correct, it becomes essential to perform measurement of low rates of flow with a precision comparable to that applying to the higher rates.

It is the object of this invention to provide a device whereby the integration of a magnitude involving measurement through means having a non-linear characteristic may be accomplished with consistent precision through a wide range of values of that magnitude.

In carrying out the invention, a plurality of measuring units are provided to measure with different degrees of sensitivity the particular variable to be integrated with respect to time, there being provided also an integrating mechanism having a single register. A corresponding number of mechanical trains for driving the integrating mechanism are provided and embody gear ratios corresponding respectively to the degrees of sensitivity of said measuring units, which trains are adapted for operative association with the said measuring units under control of their respective deflecting elements in a manner such that the action of a certain train or trains is selectively inhibited.

The nature of the invention, however, will best be understood when described in connection with the accompanying drawings, in which:

Fig. 1 is a representation, partly in perspective, and partly in plan, of a flow meter embodying the principles of the invention, together with necessary electrical connections.

Fig. 2 is a detail side elevation of a portion of the mechanism.

Fig. 3 is a perspective representation of an alternative form of flow meter embodying principles of the invention.

Fig. 4 is a detail side elevation of a portion of the mechanism shown in Fig. 3.

Fig. 5 is a front elevation showing a further alternative arrangement of measuring units, associated in this instance with electrical measuring elements.

Fig. 6 shows a wiring diagram of an alternative arrangement of electrical units.

Referring to Figs. 1 and 2 of the drawings, 10 designates a pipe or conduit, through which is assumed to be flowing in the direction indicated by the arrow a fluid whose volume it is desired to integrate on a single register with a degree of precision which shall be consistent throughout a wide range of flow values. Inserted in the pipe line is an orifice-plate 11 of well-known construction, and whereby the passage of fluid through the same causes to be developed axially of the orifice a pressure differential substantially proportional to the square of the rate of flow, which differential, through two conduits 12 and 13, respectively connected to the pipe line 10 on opposite sides of the orifice plate, is applied simultaneously to two manometer elements 14 and 15 of conventional type, but of different ranges.

The manometer 14 embodies two chambers 16 and 17 containing a heavy liquid such as mercury and connected by a U-tube 18, whereby the pressure differential in the two chambers due to the flow of fluid in the pipe line 10 through the orifice-plate 11 produces a difference of level in the mercury surfaces in the two chambers. A spindle 19, actuated by a float (not shown) located within the chamber 17, carries an arm 20 deflecting to varying extents in accordance with the response of the manometer; and its position in the plane of deflection becomes a measure of flow through the pipe line 10, all of which is well understood as recognized practice in the measurement of flow in closed conduits.

The manometer 15 embodies two chambers 21 and 22, identical in general arrangement with chambers 16 and 17 comprising the manometer 14, said chambers 21 and 22 being connected by a U-tube 23, the whole containing mercury. Within the chamber 22 is a float adapted to actuate a spindle 24 carrying an arm 25, whereby pressure differential in the two chambers 21 and 22, producing a displacement of the body of mercury, causes the arm 25 to be deflected to varying extents in accordance with the flow through the pipe line 10, to which both manometers are similarly connected.

It will be noted that, whereas the chamber 16 is relatively short in a vertical sense and wide in a horizontal sense, the chamber 21 is long in a vertical direction and of relatively small horizontal diameter. Thus, a small pressure differential applied to the manometer 14 will act to displace a relatively large volume of liquid in the chamber 16, with a correspondingly great increase in the height of liquid in chamber 17, resulting in a large deflection of the arm 20. On the other hand, because of the slender conformation of the chamber 21, a deflection of the arm 25 equal to that of the arm 20 will represent a much larger change in pressure differential between the chamber 21 and 22. As the two manometers are connected to the same orifice plate, the pressure differentials within them will be the same, so that the difference in mercury levels in the two arms of each manometer will be the same; but owing to the difference in conformation of the corresponding chambers 16 and 21, the arm 20 will be deflected through the whole of its significant excursion as the level of the mercury in the chamber 16 is lowered to a point near the bottom of the chamber, further deflection after the surface of the mercury enters the tube 18 being of negligible magnitude, while the arm 25, on the other hand, will continue to deflect uniformly through its range of travel as long as the surface of the mercury in the chamber 21 does not fall below the bottom of that chamber. By adjustment it is possible so to proportion the performance of the two manometer elements that while the arm 25 will provide significant deflections throughout the entire range of flows for which the combination is adapted, the arm 20 will effect its entire excursion with a pressure differential corresponding to a portion (for example one third) of the total range, thus providing a greatly increased precision of measurement in the lower part of the instrument range.

The plane of deflection of the arm 20 is between a flat circular plate 26 to the rear and a flat rocker-plate 27 to the front, the path of deflection of the extremity of the arm being substantially radial to the circular plate 26. The said plate 26 is carried on a centrally disposed shaft and is continuously rotated at a uniform velocity in a counterclockwise sense as seen in the drawing by a constant-speed motor 28, which may conveniently be a motor of the well-known "Telechron" type, with a suitable gear train to give the plate 26 an angular velocity of, for example, four revolutions per minute.

The rocker-plate 27 is fixed to an oscillatable shaft 29, free to swing through a small angle transversely of the plane of travel of the arm 20, and, as seen in Fig. 2, is normally held toward the plate 26 and against a stop 30 by a weak spring 31. Carried upon the extremity of the arm 20 is a rider 32, swinging freely with the arm 20 in the space normally provided between the plates 26 and 27 when the latter is resting against the stop 30. The rider 32, on its edge radially toward the spindle 19, has an inclined surface 32', and on its opposed face a surface 32" perpendicular to the plane of deflection.

Affixed to the circular plate 26, and rotating therewith, is a flat scroll-plate 33 having a leading edge 34 and a spiral trailing edge 35. The leading edge 34 is conformed to an arc of substantially the same radius as arm 20 and so positioned as to be concentric with the spindle 19 at the moment of engagement with the rider 32. Thus, as the scroll-plate rotates, the edge 34 will engage the rider 32 on its inclined surface, and lift it into engagement with the rocker-plate 27, causing the latter to be deflected in a sense perpendicular to that of rotation of the scroll-plate, and always at the same instant in the cycle of rotation of the scroll-plate, without regard to the deflected position of the arm 20 about the axis of the spindle 19. The trailing edge 35, over which the rider slips, allowing the rocker-plate 27 to be returned by the spring 31 to its normal position against the stop 30, is conformed to a spiral, the nature of which will hereinafter be set forth in more detail.

Attached to the shaft 29 is an arm 36, shown in Fig. 1, carrying on its extremity a circuit-controlling element 37 normally closing an electrical circuit at two contacts 38 and 39, and acting to open the circuit when the plate 27 is deflected by the scroll-plate member 33. Thus, as the scroll-plate 33 is continuously rotated with the plate 26, an electric circuit will be repeatedly closed and opened in definite cycles, as determined by the speed of the motor 28, the duration of each impulse so defined being dependent upon the angle subtended by the portion of the scroll-plate engaged by the rider 32.

Associated with the arm 25 is an electrical-impulse-controlling mechanism similar in every respect to that hereinabove described, and embodying a circular plate 43, continuously driven at a constant velocity by a motor 44, and carrying a scroll-plate 45 adapted to engage a rider carried upon the extremity of the arm 25, and, acting therethrough, to deflect a rocker-plate 46, actuating an arm 47 having on its extremity a circuit-controlling element 48, whereby contacts 49 and 50 are closed and opened in definite cycles and for time intervals dependent upon the angle subtended by the portion of the scroll-plate 45 engaged by the rider on the extremity of arm 25. As has hereinabove been pointed out, a linear proportionality between the durations of successive contact intervals and the flow values which they represent is obtained by the well-known expedient of conforming the trailing edge of each of the scroll-plates to a curve representing a square-root law. It will furthermore be apparent that should the measuring element be of a nature wherein the relationship between the measured magnitude and the resulting deflections is represented by some law other than a quadratic relationship, whether the characteristic curve be mathematically computable or empirical the scroll-plates associated with the impulse-controlling elements may be correspondingly conformed, and a linear relation between measured magnitude and impulse durations obtained.

Carried upon the shaft 19 is a double-throw switch 51, having three terminals or contact points 52, 53, and 54, and so actuated by the shaft 19 that as the arm 20 lies within the normal working range of its possible excursion, as determined by adjustment, and corresponding to the level of the mercury surface in the chamber 16 being above the top of the tube 18, the contact 53 will be electrically connected to the contact 52 (as shown in the drawings), and as the arm 20 reaches the upper limit of its effective range, the switch will be abruptly actuated, and, instead of contact 52, contact 54 placed in electrical connection with contact 53.

The integrator mechanism, by which electrical impulses determined by the contacts associated with the arms 36 and 47 are translated into terms of registration and proportionately integrated, will now be described. A base-plate 55 has mounted thereon a constant-speed motor 56 and a register or counting train 57, the latter carrying a gear member 58, whereby it is adapted to be driven and to provide upon its dials a reading proportional to the advance of said gear. Journalled in bearings carried by the plate 55 is a shaft 59 having fixed near one of its extremities a gear member 60 and near its other extremity a gear member 61. The gear member 60 embodies two spur gear elements 62 and 63, the former meshing with the gear 58 on the counting train, and the latter forming an element in a clutch member hereinafter to be described. Carried upon the shaft 59, and free to rotate thereon is a gear member 64 embodying two gear elements 65 and 66, the former being positioned adjacent the gear member 61, and the latter forming an element in a clutch member hereinafter to be described.

Journalled in bearings carried by the plate 55 is an idler member 67 embodying two gear elements 68 and 69, meshing respectively with the gear elements 61 and 65. The four last-named gear elements are so proportioned that upon rotation of the gear member 64 about the shaft 59, the latter, as driven by the gear element 61 affixed thereto and through the idler 67, will rotate in the same direction as said gear member 64 and at an angular velocity relatively thereto in the same ratio as that existing between the ranges of the manometers 14 and 15, as hereinabove set forth.

Carried by the shaft 59, and free to rotate thereon, is a gear member 70 embodying three gear elements as follows: a gear element 71 similar to, and positioned adjacent to, gear element 63; a gear element 72, similar to gear element 66, and an intermediate gear element 73 meshing with a gear element 74 carried by a shaft 75 and adapted to be continuously driven by the motor 56.

Positioned adjacent gear elements 63 and 71 is an elongated gear element 76 carried upon an arm 77 pivotally mounted upon the base-plate 55, and subject to actuation by an electromagnet 78, whereby, when said electromagnet is energized, said elongated gear element is caused to mesh with both gear elements 63 and 71, so that the same may rotate only as a single unit, the result being the equivalent of clutching the gear member 70 to the shaft 59.

Positioned adjacent gear elements 66 and 72 is an elongated gear element 79 carried upon an arm 80 pivotally mounted upon the base-plate 55, and subject to actuation by an electromagnet 81, whereby, when said electromagnet is energized, said elongated gear element is caused to mesh with both gear elements 66 and 72, so that the same may rotate only as a single unit. Rotation of the gear member 70 being imparted to the gear member 64 and acting through the idler 67, will cause the shaft 59 to be rotated in the same direction and at a relative angular velocity determined by the over-all ratio embodied in the gear elements 65, 69, 68, and 61. The gear elements 76 and 79 are normally maintained out of mesh with their associated gear elements by means of springs 82 and 83, attached between selected abutment points on the base-plate 55 and the arms 77 and 80, respectively, and acting in opposition to the forces exerted by the respective electromagnets.

Following are the electrical connections operatively interrelating the several elements of the apparatus: Of two conductors 84 and 85, forming the two sides of a suitable electrical supply circuit, conductor 84 is connected to one terminal of each of the motors 28 and 44 and to a common point of connection between one terminal of each of the electromagnets 78 and 81; and conductor 85 is connected to the contact point 53 of the switch 51. The free terminal of magnet 78 is connected by means of a conductor 86 to the contact element 38, and the free terminal of magnet 81 by means of a conductor 87 to the contact element 49. Contact point 52 of switch 51 is connected by means of a conductor 88 to contact element 39 and to the free terminal of motor 28. Contact point 54 of the same switch is connected by means of a conductor 89 to the contact element 50 and to the free terminal of the motor 44. The terminals of the integrator motor 56 are connected to a suitable source of supply 90, which, though not necessarily, may conveniently be the same source as that supplying the conductors 84 and 85.

For the purpose of making clear the operation of the device, it may first be assumed that the rate of flow of fluid through the pipe line 10 is relatively slow, so that the manometer 14, as shown in Fig. 1, is operating at an intermediate point in its range, while the manometer 15 is giving a deflection of neglible magnitude. Under this condition, the switch 51 will be in such a position that contacts 52 and 53 are connected, energizing the motor 28, and introducing into an operative circuit the contact elements 38 and 39, so that they are repeatedly closed and opened by the member 37 in response to movements of the rocker-plate 27. The magnet 78 in the integrator mechanism will thereby be repeatedly energized, and will cause the gear element 76 to engage and disengage the gear elements 63 and 71, whereby the constant-speed motor 56, acting through the mechanical train so completed, will cause the register 57 to be advanced by increments representative of the relative intervals of engagement and disengagement of the scroll-plate associated with the arm 20, and therefore, of the flow as measured by the manometer 14. At the same time, due to the fact that the contacts 54 and 53 in the switch 51 are separated, rendering the circuit incomplete, the motor 44 will remain at rest, the magnet 81 inert, and the gear element 79 disengaged. Thus, under the condition assumed, all advance of the register 57 will be subject to measurement as affected by the manometer 14, and the integration will be carried out with a precision consistent with the deflection of the pointer-arm 20, rather than the relatively small deflection of the arm 25 associated with the less sensitive manometer 15.

Assuming now a material increase in the rate of flow, so that the arm 20 approaches the upper limit of its range, at a certain predetermined point in its excursion the switch 51 will be actuated to transfer connection with the contact 53 from the contact 52 to the contact 54, whereupon the motor 28 is at once brought to rest and the contacting mechanism associated with the manometer 14 becomes ineffective. At the same time the circuit is established for energizing the motor 44, and for the contact elements 49 and 50, as engaged by the circuit-controlling member 48, to energize the magnet 81, which, acting through the gear element 79, will complete the mechanical train from the motor 56 through the gear system embodied in the idler 67 and associated gear members to the shaft 59 and thence to the register 57. The advance of the register will then be proportional to the flow as measured by the mamometer 15, and at a rate bearing to the former rate the same ratio as that of the sensitivities of the respective manometer elements. Upon a reversion of the rate of flow to its originally assumed lower value, the switch 51 will again be thrown to its original position, and integration will be transferred back to the original train associated with the manometer 14.

In Fig. 3 is shown an alternative embodiment of the invention, in which a single scroll-plate with its driving mechanism performs the function of the two scroll-plates 33 and 45 with their associated driving mechanisms, this feature, where applicable, materially simplifying the construction of the instrument. Two manometer elements 91 and 92, identical in every respect to the mamometers 14 and 15 of the embodiment shown in Fig. 1, are similarly connected to an orifice member (not shown), thereby being adapted to provide measures to different degrees of sensitivity of the flow of a fluid through said orifice member. The manometer element 91 carries a shaft or spindle 93 adapted for limited angular deflection in response to changes in the measurement performed by the manometer, and affixed to said spindle is an arm 94, whereby said measurement is at all times represented by a deflection of said arm about the axis of rotation of spindle 93.

The manometer element 92 carries a spindle 95 upon which is mounted a short arm 96, providing an angular deflection representative of measurement made by the manometer 92.

Carried by the spindle 93 and free for angular rotation relative thereto is an extended arm 97, operatively connected to the arm 96 by an extended link member 98 pivotally attached to both said arms, whereby the arm 97 is caused to deflect concentrically to the deflection of the arm 94 and to an extent representative of measurement performed by the manometer 92.

While the arms 94 and 97 are of necessity axially displaced in their mountings on the spindle 93, the latter arm, by means of an offset portion 99, is caused to have its extremity move in the same plane as that of the former; and since, by the application of the invention to the measurement of one quantity with different degrees of response or sensitivity one arm will always lie in lower portion of its arc of deflection than the other, the extremities of these arms will never have occasion to engage or pass each other while in operation.

Immediately in front of the common plane of deflection of the extended arms 94 and 97 are mounted two flat rocker-plates 100 and 101, fixed respectively to oscillatable shafts 102 and 103, so that each plate is free to swing through a small angle transversely of the plane of deflection of the arms 94 and 97, the free edges of the plates being closely juxtaposed along an arcuate dividing line concentric with the spindle 93. As will be seen by reference to Fig. 4, the rocker-plate 100 is normally held in engagement with a fixed stop 104 by means of a spring 105, and rocker-plate 101 is normally held against a stop 106 by a spring 107, each of the plates being subject to movement away from the plane of deflection of the arms 94 and 97 by light mechanical pressure from the rear.

Carried upon the extremity of the arm 94 is a rider 108 swinging freely with the arm in the space immediately to the rear of the rocker plate. The rider 108 on its edge radially toward the spindle 93 has an inclined surface 109, and on its edge remote from the spindle a surface 110 perpendicular to the plane of deflection. The rider 108 carries also a projection portion 111 adapted to engage the rear surface of the rocker-plate 100 upon a slight motion of the rider toward said plate. Carried upon the extremity of the arm 97 is a rider 112 swinging freely with said arm in substantially the same path as the rider 108, and having an inclined surface 113 and a perpendicular surface 114 on its edges toward and remote from the spindle 93 respectively. The rider 112 carries also a projecting portion 115 adapted to engage the rear surface of the rocker-plate 101 upon a slight movement of the rider toward the plate.

A circular disk member 116 carried on a shaft 117 is continuously rotated at a uniform angular velocity in a counter-clockwise sense by means of a motor 118, the plane of rotation of said disk being parallel to that of deflection of the arms 94 and 97 and a short distance behind the same. Affixed to the disk member 116 and rotating therewith is a flat scroll-plate 119 having a leading edge 120 and a spiral trailing edge 121. The leading edge is conformed to an arc of substantially the same radius as the arcuate line dividing the adjacent edges of the rocker-plates 100 and 101, the scroll-plate being so positioned on the disk 116 that at one point in the rotation of the scroll-plate about the axis of shaft 117 the center of said arc coincides with the axis of the spindle 93. Thus, as the scroll-plate rotates, the edge 120 will engage the riders on their inclined surfaces and lift them into engagement through their respective projecting portions 111 and 115 with the rocker-plates, causing the latter to be deflected in a sense perpendicular to that of rotation of the scroll-plates, and always at the same instant in the cycle of rotation, without regard to the deflected positions of the arms 94 and 97 about the axis of spindle 93. The trailing edge 121, over which each rider slips, allowing its associated rocker-plate to be returned by its attached spring to its normal position against its stop, is conformed to a spiral, the nature of which has been set forth in reference to the equivalent elements shown in Figs. 1 and 2.

Attached to the shaft 102 is an arm 122 carrying on its extremity a circuit-controlling element 123 normally closing an electrical circuit between two contacts 124 and 125, and acting to open the circuit when the plate 100 is deflected by the scroll-plate 119 engaging the rider 108.

Attached to the shaft 103 is an arm 126 carrying on its extremity a circuit-controlling element 127 normally closing an electrical circuit between two contacts 128 and 129, and acting to open the circuit when the plate 101 is deflected by the scroll-plate 119 engaging the rider 112. Thus, as the scroll-plate 119 is continuously rotated with the disk 116, electrical circuits will be repeatedly closed and opened by the respective circuit-controlling members, the duration of each impulse so defined being dependent upon the deflections of the respective arms 94 and 97 in accordance with the magnitudes measured thereby.

Carried upon the spindle 93 is a double-throw switch 130 having three terminals or contact points 131, 132, and 133, and so actuated by the spindle 93 that as the arm 94 lies within the normal working range of its possible excursion, the contact 132 will be electrically connected to the contact 131 (as is shown in the drawings), and as the arm 94 reaches the upper limit of its effective range, the switch will be abruptly actuated, contact 133 instead of contact 131 being placed in electrical connection with contact 132.

The integrator mechanism, by which electrical impulses determined by the contacts associated with arms 122 and 126 are translated into terms of registration and proportionately integrated, is in all respects identical with that shown in Fig. 1, having two actuating electromagnets (diagrammatically indicated at 135 and 136 in Fig. 3) adapted to be periodically energized through circuits hereinafter to be designated, and a continuously running electric motor (not shown) adapted to drive a register mechanism through gear trains of different ratios subject to completion and interruption by the respective electromagnets.

The electrical circuits operatively interrelating the several elements of the mechanism are as follows: Of two conductors 137 and 138 forming the two sides of a suitable electrical supply circuit, conductor 137 is connected to one terminal of the motor 118, and also to a common point of the two electromagnets 135 and 136, and conductor 138 is connected to the other terminal of the motor 118 and to the common contact point 132 of the switch 130. The free terminal of magnet 135 is connected by means of a conductor 139 to the contact element 124, and the free terminal of magnet 136 is connected by a conductor 140 to the contact element 128. Contact point 131 of switch 130 is connected by means of a conductor 141 to contact element 125, and contact point 133 by a conductor 142 to contact element 129.

The operation of the device is essentially similar to that of the embodiment shown in Figs. 1 and 2, and fully set forth in the specification referring thereto. By virtue of the difference in sensitivity of the two flow measuring elements the arm 94 will respond and complete the greater part of its excursion before the arm 97 reaches a working point in its path of travel. At the same time, the switch 130 being in a position wherein contact points 131 and 132 are connected, the only impulses reaching the integrator mechanism will be those developed by the action of the circuit-controlling device 123 in response to movements of the rocker-plate 100 and quantitatively representing deflections of the arm 94 associated with the manometer element 91, the more sensitive of the two measuring elements. As the arm 94 approaches the limit of its working range, and the deflection of the arm 97 becomes of significance, the switch 130, carried by the spindle 93, is actuated in a manner to connect contact point 133 instead of 131 to the common point 132, thus cutting out of circuit the magnet 135 and the contact system in series with it, and at the same time rendering the magnet 136 subject to periodic energization by the circuit-controlling element 127 in response to movements of the rocker-plate 101, and quantitatively representing deflections of the arm 97. It will be apparent that the performance of the mechanism as shown in Figs. 3 and 4 is thus in all respects identical with that set forth in connection with Figs. 1 and 2, with the single exception that, instead of there being two driving motors, which may be alternatively energized, there is a single driving motor 118, which remains in continuous operation.

Thus, by the use of two manometer elements having different inherent sensitivities throughout the working parts of their respective ranges, there has been provided integrating means having for rates of flow corresponding to the lower parts of the range of measurement a precision greatly increased in comparison with that possible in an integrator used in conjunction with an orifice plate or the like associated with but a single manometer element.

In Fig. 5 is shown a form of the invention in which, while two measuring elements are engaged by a single scroll-plate, the deflecting arms whose positions in relation to the scroll-plate determine the durations of electrical impulses controlled thereby are not deflected about a common axis, but about centers equidistant from the center of rotation of the scroll-plate and displaced about said center of rotation by an angle sufficiently great to permit independent operation of rocker-plates and other non-coacting parts.

A scroll-plate 145 having a spiral trailing edge and a leading edge conformed to an arc as hereinafter set forth is carried by a disk 146 mounted on a shaft 147 and constantly rotated in a counter-clockwise sense and at a uniform velocity by motor means (not shown), but in all respects identical with that set forth in connection with Fig. 3. Two measuring elements 148 and 149, having deflecting equal arms 150 and 151, respectively, are positioned with the axes of deflection of said arms equidistant from the center of the shaft 147 and angularly spaced thereabout, the paths of excursion of the extremities of said arms in response to variations in the measured magnitudes both lying within the limits of radii of the disk 146 and the arcuate leading edge being conformed to coincide with said paths as the scroll-plate 145 assumes corresponding angular positions about the shaft 147. A rocker-plate 152, attached to, and swingable through a small angle with, a shaft 153 lying in a plane parallel to that of rotation of the disk 146, is adapted to be so moved by a rider (not shown) carried on the extremity of arm 150 when the latter is engaged by the scroll-plate 145 in its rotation. A rocker-plate 154 attached to, and swingable through a small angle with, a shaft 155 is similarly adapted to be moved by a rider (not shown) on the extremity of arm 151. Extended arms 156 and 157 are mounted on shafts 153 and 155, respectively, and are adapted to actuate circuit-controlling members 158 and 159 respectively, so that there may be developed in electrical circuits connected thereto periodic impulses having durations representative of the angles of deflection of the arms 150 and 151, and therefore of the magnitudes measured thereby. Operatively associated with the arm 150 is a double-throw switch 160 having three contacts 161, 162, and 163, and so positioned that during the time arm 150 lies within the working portion of its range contacts 161 and 162 are connected, and when the arm 150 passes above said range contacts 163 and 162 are connected.

Electromagnets 164 and 165, constituting the actuating elements in an integrating mechanism identical in all respects with that shown in Fig. 1, are connected in circuit with a suitable power source 166 and other elements of the system in such a manner that circuit-controlling member 158 is in series with magnet 164 through contacts 161 and 162, and circuit-controlling member 159 is in series with magnet 165 through contacts 163 and 162.

While the measuring elements associated with the integrating system may be manometers, as in the embodiments hereinbefore set forth, the principles of the invention are equally applicable to other types of measuring instruments having non-linear characteristics, such, for example, as alternating-current ammeters and voltmeters; and, as typical of these, the measuring elements are in this instance shown as electrical movements of the electro-dynamometer class. Stationary coils C, C, and C', C' in the two measuring elements are connected in series with each other across binding posts T, T', forming the terminals of the instrument. Movable coils F, F', in electromagnetic relation to the respective coils C, C and C', C', are arranged for rotation about their diametrical axes perpendicular to the axes of the fixed coils, and coincident with the axes of deflection of the arms 150 and 151, to which they are attached. Thus the deflection of each of said arms becomes a measure of the electromagnetic reaction between its associated fixed and movable coils. In accordance with a well-known construction of such movements (see "Instruments", May, 1934, page 93), the movable coils, which, principally for mechanical reasons, are wound of fine wire, may be connected across shunts S, S', in series with the fixed coils, in which case the electromagnetic reactions between fixed and movable coils becomes proportional to the square of the value of current flowing. By adjusting the values of the shunts in the two measuring elements, or by other means well known in the art of electrical instrumentation, the sensitivities of the two elements may be made to bear any desired relation to each other, so that the element 148 may be given a full-scale deflection corresponding to a part of the current which the instrument as a whole is designed to measure, while the element 149, having a lower sensitivity, will be entering the useful portion of the scale as increasing current attains a value corresponding to the limit of deflection of the element 148. Thus there has been provided integrating means for alternating currents whereby ampere-hour determinations at relatively low values of current may be made with a degree of precision consistent with that attained when the measured current is of values corresponding to the higher parts of the range of the instrument.

Fig. 6 shows a conventional manner in which the windings of the electrodynamic movements of the embodiment shown in Fig. 5 may be connected to perform measurement of electrical energy instead of electrical quantity as expressed in ampere-hours. The fixed coils D, D and D', D' are connected in series and carry the current in the circuit upon which measurement is to be performed. The moving coils G, G' are interconnected and placed in series with a suitable resistor R, and to the latter combination is applied the voltage of the circuit. The resulting reaction is proportional to the watts in the line; and, with the two elements adjusted to different degrees of sensitivity as hereinbefore set forth, and the instrument provided with a scroll-plate having a suitably conformed trailing edge consistent with the characteristically uniform scale of the wattmeter, there is provided a means for obtaining registration of watthours in an electrical circuit with a precision of measurement at light loads consistent with that obtainable when the circuit conditions approach those of full load on the instrument.

While it will be apparent that this invention is applicable to the integration of any measured quantity whose value may be represented by successive impulses of proportionate duration, whether inherently proportionate and subject to translation from a deflection to a series of impulses by a scroll-plate conformed to an arithmetical spiral, or inherently disproportionate and requiring a scroll-plate with a specially computed contour conformation, it is obvious that the particular use of the device lies in its application to the integration of variables following a non-linear law, and whose precision of measurement is inherently less at one portion than another of the range of the measuring element. Thus, while suited to use with a primary measuring element whose deflection varies directly as the measured magnitude, its most important use is found in conjunction with measuring elements whose deflection have the quadratic characteristic inherent to flow meters, for obtaining a measure of the total volume of a fluid.

The present application is a continuation-inpart of an application Serial No. 182,038, filed by me December 28, 1937, for Integrating apparatus.

I claim:

1. In a meter for integrating a variable with respect to time: the combination with two measuring units, each including a deflecting element and adapted to measure said variable respectively with different degrees of sensitivity; of driving mechanism, an integrating mechanism having a single register and two gear trains adapted for selectively providing connection between the integrating mechanism and the driving mechanism, the transmission ratios of said gear trains corresponding respectively to the degrees of sensitivity of said measuring units, means for rendering the duration of such connection dependent upon the deflected position of said elements, and means for operatively associating one or the other of said gear trains with the driving mechanism according to the deflected position of one of the deflecting elements.

2. In a meter for integrating with respect to time a variable producing a response related to said variable by a non-linear law: the combination with two measuring units of similar characteristics and each including means to compensate for said non-linear law, one of said units having materially greater sensitivity than the other, whereby there will be produced in it a full-range response with a change in said variable corresponding to a partial-range response in the other unit; of driving mechanism, an integrating mechanism having a single register and two mechanical trains adapted for intermittently and selectively connecting the integrating mechanism with the driving mechanism for successive time intervals corresponding in duration to the then values of said variable, said trains embodying gear ratios corresponding respectively to the degrees of sensitivity of said measuring units, together with means for operatively associating the train having the lower ratio with the unit having the greater sensitivity when values of the variable lie within its operating range, and for operatively associating the train having the higher ratio with the unit having the lesser sensitivity when said values lie beyond the range of said more sensitive unit.

3. In a meter for integrating the flow of a fluid with respect to time: the combination with a device whereby the flow of said fluid sets up a pressure differential proportional substantially to the square of the rate of flow, and two manometers adapted to measure individually said differential, one having a range suited to the whole range of flow values to be measured, and the other having a relatively limited range; of driving mechanism, an integrating mechanism having a single register and two mechanical trains adapted for selectively connecting the register with the driving mechanism, said trains embodying gear ratios corresponding to said ranges of measurement, electrical means for rendering said trains effective for time intervals proportional to the square roots of the measurements performed by said manometers, and means for selectively inhibiting the action of one or the other of said electrical means according to the magnitude of measurement performed by one of said manometers.

4. In a meter for integrating a variable with respect to time: the combination with two measuring units adapted to measure said variable with different degrees of sensitivity; of an integrating mechanism having a register, motor means for driving the same, intermediate mechanical means for operatively associating said motor means with said register, said mechanical means including a plurality of gear trains adapted to operate said register at rates of advance corresponding respectively to the degree of sensitivity of said measuring units, means for operatively associating, through one or the other of said gear trains, said register alternatively with a corresponding one of said measuring units, said associating means including two electromagnets, and means for periodically energizing and de-energizing a selected one of said magnets in accordance with the measurements performed by a corresponding one of said measuring units, together with means for selectively inhibiting the action of the other of said magnets according to the magnitude of measurement performed by one of said measuring units.

5. In a meter for integrating a variable with respect to time: the combination with two measuring units adapted to measure said variable with different degrees of sensitivity; of an integrating mechanism having a register, motor means for driving the same, intermediate mechanical means for operatively associating said motor means with said register, said mechanical means including a plurality of gear trains adapted to operate said register at rates of advance corresponding respectively to the degrees of sensitivity of said measuring units, means for operatively associating, through one or the other of said gear trains, said register alternatively with a corresponding one of said measuring units, said last-named means including two electro-responsive devices and circuit-controlling devices for respectively actuating the same, together with means for selectively inhibiting the action of a circuit-controlling device according to the magnitude of measurement performed by one of said measuring units.

6. In a meter for integrating a variable with respect to time: the combination with two measuring units adapted to measure said variable with different degrees of sensitivity; of an integrating mechanism having a register, motor means for driving the same, intermediate mechanical means for operatively associating said motor means with said register, said mechanical means including a plurality of gear trains adapted to operate said register at rates of advance corresponding respectively to the degrees of sensitivity of said measuring units, means for operatively associating, through one or the other of said gear trains, said register alternatively with a corresponding one of said measuring units, said last-named means including two electro-responsive devices and circuit-controlling devices for respectively actuating the same and motors for actuating said circuit-controlling devices in accordance with measurements performed by said measuring units, together with means for selectively inhibiting the action of one or the other of said motors according to the magnitude of measurement performed by one of said measuring units.

7. In a meter for integrating a variable with respect to time: the combination with two measuring units adapted to measure said variable with different degrees of sensitivity; of an integrating mechanism having a register, motor means for driving the same, intermediate mechanical means for operatively associating said motor means with said register, said mechanical means including a plurality of gear trains adapted to operate said register at rates of advance corresponding respectively to the degrees of sensitivity of said measuring units, means for operatively associating, through one or the other of said gear trains, said register alternatively with a corresponding one of said measuring units, said last-named means including two electro-responsive devices and circuit-controlling devices for respectively actuating the same and electric motor means for actuating said circuit-controlling devices in accordance with measurements performed by said measuring unit, a source of power supply and a circuit for each of said motors, together with means for selectively completing said circuits to said motors according to the magnitude of measurement performed by one of said measuring units.

8. In a meter for integrating a variable with respect to time, a counting register, mechanism including two mechanical transmission trains for advancing said register at different speeds, and constant speed means for driving the same, separate electromagnetically actuated means for interrupting and completing each of said trains, two metering elements for measuring the same magnitude with different degrees of sensitivity, impulse-controlling means subject to said metering elements for establishing periodically recurrent electrical impulses of successive durations representative of measurements performed by said elements and in two groups corresponding to said elements respectively, together with means for selectively rendering said electro-magnetic means responsive to said impulse groups and the said selective means being subject to the magnitude of measurement performed by one of said metering elements.

9. In a meter for integrating a variable with respect to time, a counting register, mechanism including two mechanical transmission trains for advancing said register at different speeds, and constant speed means for driving the same, separate electromagnetically actuated means for interrupting and completing each of said trains, two metering elements for measuring the same magnitude with different degrees of sensitivity, impulse-controlling means subject to and in part common to said metering elements for establishing periodically recurrent electrical impulses of successive durations representative of measurements performed by said elements and in two groups corresponding to said elements respectively, together with means for selectively rendering said electromagnetic means responsive to said impulse groups and the said selective means being subject to the magnitude of measurement performed by one of said metering elements.

10. In combination: a plurality of metering units, each having a deflecting member adapted to provide by its deflection a measure of a magnitude, continuously operating means having a single conformed surface subject to independent periodic engagement by said members at uniform time intervals, and to subsequent disengagement by the same at time intervals after engagement governed by the deflected positions of the respective deflecting members, separate impulse-controlling means adapted for independent operation by corresponding portions of said deflecting members upon engagement or disengagement of said members with said surface, whereby said impulse-controlling means are caused to produce independent groups of periodically recurring impulses of successive durations representative of the magnitudes measured by said metering units, and means for coordinating said groups of impulses, together with means subject to the deflected position of one of said members for rendering said coordinating means subject alternatively and selectively to said independent groups of impulses.

JOHN WINFRED BEECHER.